Sept. 27, 1960  L. LEITZ  2,953,981
CAMERA HAVING BUILT-IN TELEMETER
Filed July 30, 1954  7 Sheets-Sheet 1
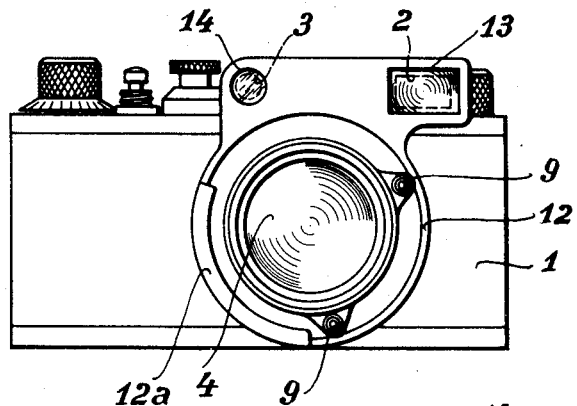
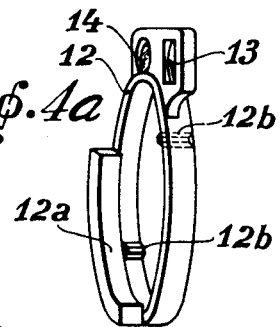
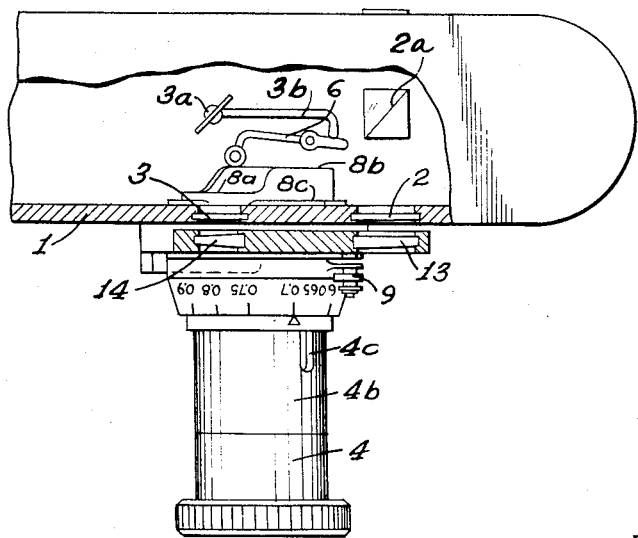
INVENTOR.
Ludwig Leitz
BY Benj. T. Rauber
his attorney

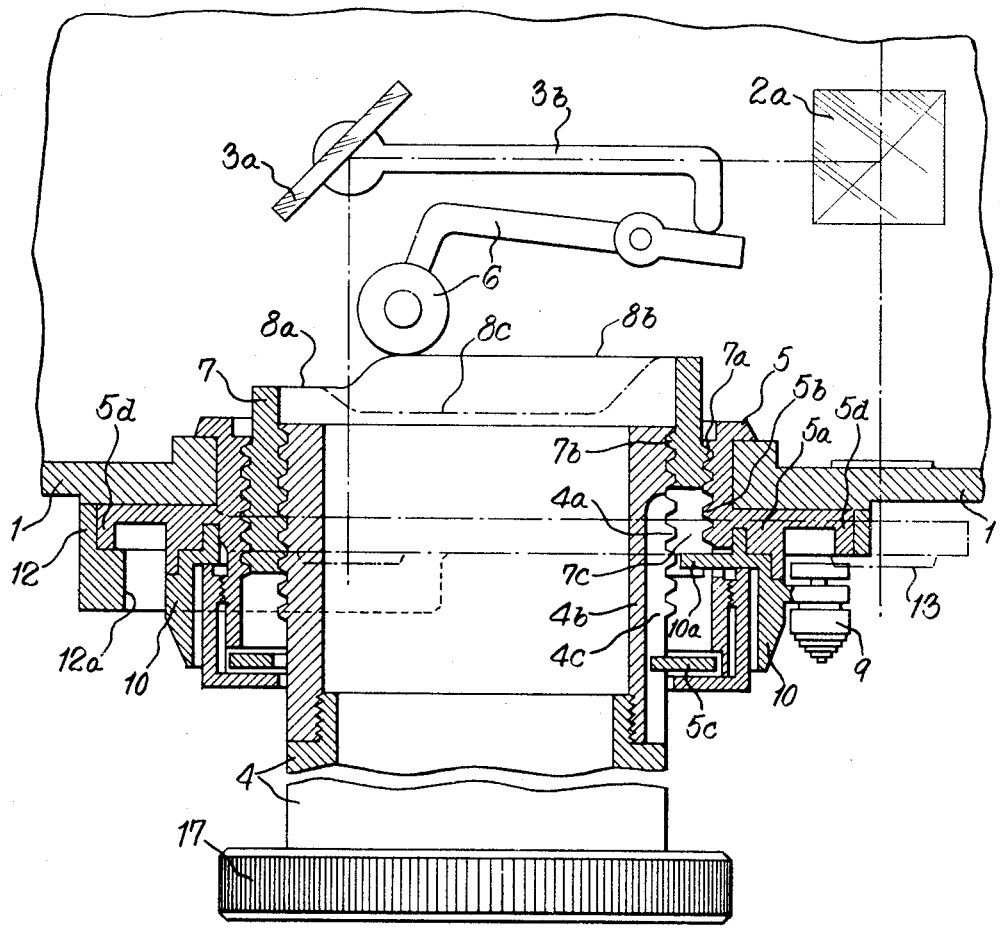

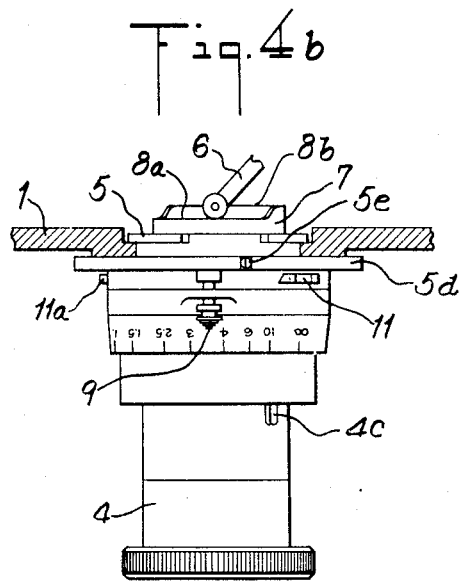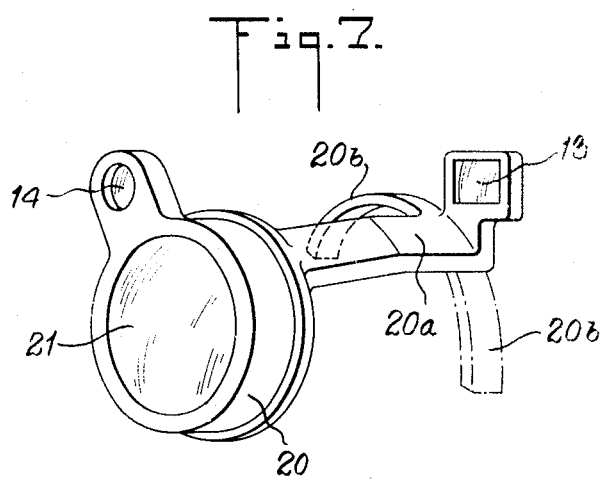

Sept. 27, 1960  L. LEITZ  2,953,981
CAMERA HAVING BUILT-IN TELEMETER
Filed July 30, 1954  7 Sheets-Sheet 4
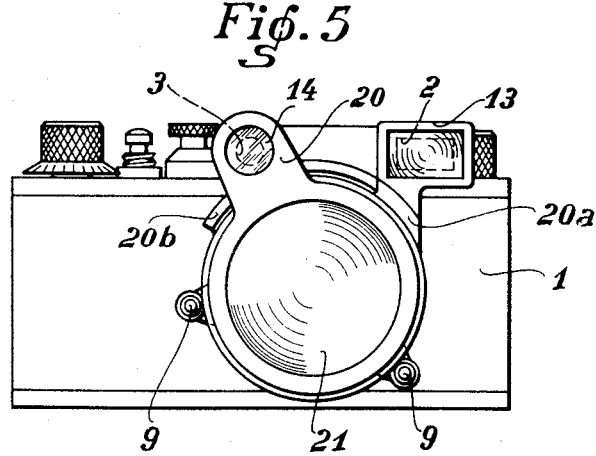
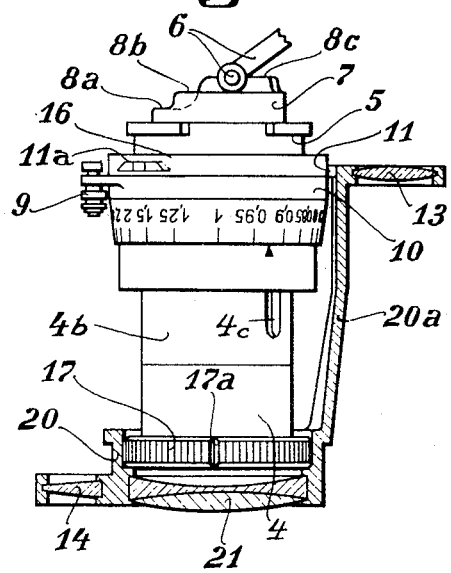
INVENTOR.
Ludwig Leitz
BY Benj. T. Rauber
his attorney Sept. 27, 1960  L. LEITZ  2,953,981
CAMERA HAVING BUILT-IN TELEMETER
Filed July 30, 1954  7 Sheets-Sheet 5

Sept. 27, 1960  L. LEITZ  2,953,981
CAMERA HAVING BUILT-IN TELEMETER
Filed July 30, 1954  7 Sheets-Sheet 7

INVENTOR.
Ludwig Leitz
BY
Benj. T. Rauber
his attorney

# United States Patent Office 2,953,981
Patented Sept. 27, 1960

2,953,981

CAMERA HAVING BUILT-IN TELEMETER

Ludwig Leitz, Laufdorferweg, Wetzlar (Lahn), Germany, assignor to Ernst Leitz, G.m.b.H., Wetzlar (Lahn), Germany, a corporation of Germany Filed July 30, 1954, Ser. No. 446,882

Claims priority, application Germany Aug. 3, 1953

17 Claims. (Cl. 95—44)

My invention relates to a camera with a built-in telemeter, particularly an exploring telemeter whose adjustment is coupled with exchangeable objective for short distances with an adjustment for sharp definition.

The usual cameras with built-in telemeters have heretofore had an adjustment limit which extends between infinity ($\infty$), and one meter (1 m.). Heretofore if one should wish to adjust sharply for photographing at a distance smaller than 1 m., using a built-in telemeter, it was necessary to provide the telemeter with an attachable deflection element and also to insert an ancillary lens on the photographic field lens or increase its distance from the image plane by means of an inserted tube with an accompanying arrangement of an attachable coupling for the telemeter coupling. The distance measurements readable on the objective or telemeter, however, did not then hold for the short range apparatus. Apparatus of this type have been known as optical short range apparatus. They have the disadvantage that in every case extensive rearrangements and changes must be undertaken at the camera before the camera is again set in readiness. Besides, to be in readiness, cameras of this type required various attachments capable of being combined with each other but not suited to each other so that the danger of confusion resulted.

My invention obviates these disadvantages. To this end the telemeter of my invention has a range of adjustment of optical deflection elements which corresponds approximately to the range of adjustment from $\infty$ to 1 m., hitherto known. The adjustment holder of the objective in my invention presents at least two adjoining paths at different levels, preferably as circular or curved segments about a center (comparison curves) co-operating with the control arm of an optical deflection element of the telemeter. Each adjustment path presents in its adjustment range a corresponding change in height to the optical deflection element. These paths are so arranged that upon transition from one to the other they instantly change or step the position of the adjustable optical deflection element of the telemeter. The axial range of placement of the objective (objective step-tube extension) for short distances is thus lengthened over that for the distance range between $\infty$ and 1 m., corresponding to the number of ranges of adjustment provided. The total turning and positioning paths of the adjustment fastening (objective turning) for all ranges of adjustment of the telemeter amounts to a turning angle less than 360°. For at least one of the two or more ranges of adjustment there is provided in one or both measuring beam paths of the telemeter insertable optical elements with fixed deflection.

In such an arrangement it is possible to accomplish a precise adjustment of the objective measurement over a great range of adjustment from $\infty$ to a very short distance by means of the telemeter without the necessity of inserting or exchanging ancillary lenses or a magnascope or an intermediate tube with substitute telemeter coupling means for the receiving objective. Actually the substitute deflection elements for the telemeter are mounted in a series arrangement which, however, can follow without modification of the camera. Since the telemeter is provided with the usual adjustable stroke for distances from $\infty$ to 1 m., such an arrangement can also be added supplementarily to existing cameras and with an exchangeable objective coupling for the governing arm of the telemeter.

The various embodiments, as well as further examples of the invention, are illustrated, by way of example, in the accompanying drawings in which—

Fig. 1 is a front view of the camera provided according to the invention with mountable attachments in front of the telemeter windows;

Fig. 2 is a plan view of the camera of Fig. 1 partly in section with a diagrammatic illustration of the telemeter elements;

Fig. 3 is a horizontal axial section on a larger scale of the objective shown in Fig. 2;

Fig. 4a is a perspective view of a carrier for the mountable optical refractive members to be mounted on the carrying part of the objective mounting or on the camera housing;

Fig. 4b is a plan of the objective with parts of the camera wall shown in section;

Fig. 5 is a front view of another embodiment of my invention;

Fig. 6 is a plan view partly in section of a telemeter of my invention having some parts similar to those of the embodiment of Figs. 1 to 3, and similarly identified;

Fig. 7 is a perspective view of a rotatable carrier forming an element of the embodiment of Figs. 5 and 6 and shown in broken line in the second position of rotation;

Figure 8:
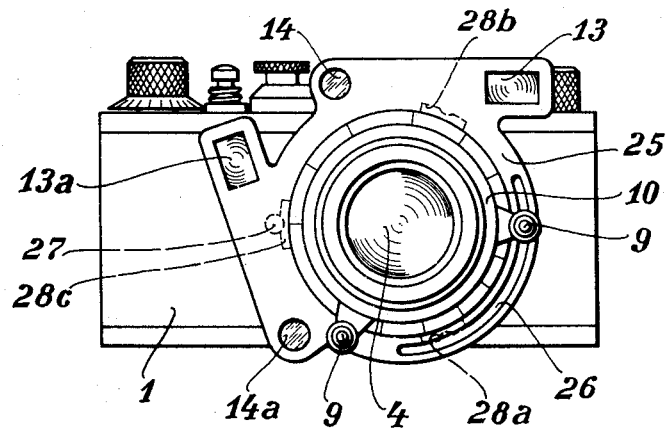
Fig. 8 is a front view of another embodiment of the invention.

In all of the embodiments of the invention shown, as in Figs. 1–3, there is mounted in the upper part of the camera housing an optical light beam splitting element 2a and a movable optical reflecting element 3a of a range finder or range selector of known type. On the front part of the camera housing 1, as viewed from the receiving direction, are viewing windows 2 and 3 in front of the optical telemeter members 2a and 3a. The optical deflecting or reflecting member 3a of the telemeter is provided with a lever arm 3b which is actuated in known manner by a control lever 6 operated by the focusing mounting of the objective 4 for the purpose of turning the optical reflecting member 3a in accordance with the exact focusing movement of the objective.

The objective 4 is movably secured on the camera housing 1 by means of a bayonet coupling 5 of this focusing mounting. The focusing mounting consists of a mounting part 5a carrying the bayonet coupling 5 and having inner screw threads 5b, an adjustment ring 10 rotatably mounted but not axially shiftable on the mounting part 5a, and having a hand knob 9 and an intermediate hollow screw 7 with exterior screw threads 7a and interior screw threads 7b. The outer screw threads 7a engage in screw threads 5b in the mounting part 5a and inner screw threads 7b engage in screw threads 4a of the tube 4b carrying the objective 4.

The adjustment ring 10 has a projection 10a engaging in an axial slit 7c of the intermediate hollow screw 7 and thereby transmits its movement of rotation to the intermediate screw 7 nevertheless without joining in the axial shifting resulting from the pitch of the screw. The objective tube 4b is provided with a longitudinal slit 4c which is engaged by a projection from a guide ring 5c mounted in the mounting part 5a in fixed position with a slight play and which prevents rotation of the objective tube 4b on its axis in order to give a straight line axial movement.

Focusing mountings of the above type are well known in the art. Their manner of operation is as follows:

The adjustment ring 10 is rotatable by means of the hand knob 9 about the optical axis of the objective 4. The movement of rotation of the adjustment ring is transferred through the projection 10a and the slit 7c to the intermediate screw 7 so that the intermediate screw 7 partakes of the rotational movement. By this means the wall 7a of the intermediate screw 7 screws in the threads 5b of the mounting part 5a forwardly or back according to the direction of movement so that an axial shifting of the intermediate screw 7 takes place. At the same time the screw 7b of the intermediate screw 7 acts on the screw threads 4a of the objective tube to shift the tube 4b axially and with it the objective 4 carried on it. A turning of the objective 4 about its optical axis does not take place because of the direct or straight line guides 10a and 5c. The axial shifting of the intermediate screw 7 is transferred to the cylindrical cam surfaces 8a and 8b and carried over to the test lever 6 which contacts the telemeter 2a, 3a so that the exact focusing of the objective 4 and the turning of the deflecting or reflecting member 3a of the telemeter 2a, 3a follow in mutual interdependence. Instead of basing the test lever 6 on the rear edge of the intermediate screw 7 it could be based on the rear edge of the tube 4b. In this case the intermediate screw 7 and the direct line guide 10a, 5c, could be eliminated and the axial shifting could be accomplished by a direct engagement of the tube screw threads 4a in the screw threads 5b on turning the tube 4. These types of construction have been known in the art.

According to the invention the rear edge of the intermediate screw 7, or in a given case the rear edge of the objective tube 4b, can be formed as a stepped cam or curve with two or more steps 8a, 8b, 8c (Figs. 2, 3, 4b, 6 and 9) which are in cooperation with the test lever 6 of the optical deflecting member 3a of the telemeter. The pitch of the screw threads 4a, 7a, 7b, 5b (Fig. 3) which actuate the objective 4 axially for sharp focusing are so selected that the angle range of a single cam step 8a, 8b, etc., and of the corresponding adjustment angle at the focusing ring 10 brings about the total extent of tilting of the optical deflecting member 3a in each case within these adjustment ranges. The angle of tilting of the optical deflecting member 3a is accordingly limited to the normal adjustment range corresponding to ∞–1 m. With an objective of two cam steps the combined turning angle of the optical deflector used for control of fine focusing is twice as much and with three cam steps it is three times as much, etc. The objective 4 thereby experiences according to the selected pitch of the screw a twofold, threefold, etc., greater adjustment path corresponding to a greater axial shifting or tube extension than corresponds to the usual ∞–1 m. adjustment so that also essentially shorter shooting or taking distances than 1 m. can be sharply adjusted under the adjustment control by means of the telemeter. By these means an objective thus constructed in spite of the greatly increased range of adjustment and with a control by means of the telemeter, one can succeed essentially in focusing more exactly to the correct distance than when only one stage of adjustment path of the telemeter element 3a for the entire focusing path of the objective is available.

Besides the use of several adjustment paths for the optical deflecting element 3a of the telemeter 2a, 3a and the increased tube travel or axial shifting of the objective 4, there is also required an optical proportioning of the telemeter for use of the second and each additional adjustment path for the optical deflecting element 3a. According to the invention this is attained by means of optical members 13, 14, 13a, 14a, for example, prism wedges, attachable in front of the viewing windows 2, 3 of the telemeter 2a, 4a (Figs. 1, 2, 5, 7, 8, 10) which serve to give the light beams passing to the telemeter a constant additional deflection proportionate to the inherent adjustment range and to correct the image section in the selector.

The optical attachments 13, 14 are mounted on common holders which are arranged detachably or slidably on the camera housing or on the focusing mounting of the objective 4 according to the form of embodiment. These holders, and in a specific example the focusing mounting of the objective 4 or the camera housing, are provided at places suitable for the purpose with stop elements which serve to limit the turning range of the adjustment ring 10 and of the handle knob 9 in such manner that the objective final adjustment is possible only in the focusing range for which the correct accommodation of the telemeter has been provided by removing or replacing corresponding optical attachments 13, 14, 13a, 14a. Details of these means are more closely illustrated in the following description of the several examples of embodiments.

In the modification of Figs. 1 to 4b inclusive a carrier ring 12, Figs. 3 and 4a, for supplemental optical deflecting members 13 and 14 to be shifted in advance of or in series with the optical elements 2a, 2, 3a, 3, of the range finder, Fig. 2, is slidably mounted on the collar or flange 5d of the focusing mounting of the objective 4. It will be understood that the collar or flange 5d may also be part of the camera housing. The carrier 12 and its supporting collar 5d are provided with guide and follower means 12b and 5e, Figs. 4a and 4b for insuring proper positioning of the members 13 and 14 opposite to the telemeter windows 2 and 3.

The carrier 12 has a locking segment 12a, Figs. 3 and 4a, which limits the setting range of the focusing mounting of the objective 4 by limiting the path of rotation of the handle 9 whereby the handle 9 and its distance adjustment ring 10 can be turned only in the range limited by the stopping element 12. The part of the path of rotation for the handle and its respective stop not restricted by the stopping segment 12a corresponds to the near range of distance less than 1 m. of the adjustment of the field of measurement provided with the shiftable optical elements 13 and 14 and the corresponding stepped curve, for example 8b, of the objective mounting.

The range of distance ∞–1 m. is controlled by the curved or cam step 8a of this arrangement. The limits of this range can result from two fixed stops 11 and 11a (see Figs. 4b and 6) arranged at corresponding distances from one another which cooperate with at least one of the spring pressed detents 9, said stops 11, 11a limiting the path of rotation of the handle 9 or focusing ring 10 respectively for setting the range of distance ∞–1 m.

The above described embodiment comprises two ranges of adjustment of the telemeter—the normal range (∞–1 m.) and the near range (less than 1 m.) When additional near ranges are desired curved step 8c and a corresponding lengthened shifting of the objective are provided as well as additional carriers 12 with optical members 13 and 14 to be shifted in front of the telemeter member positioned by the governing arm 6.

The stop segment 12a must then be so arranged on its carrier 12 that other corresponding parts of the range of rotation of the stops and handle 9 are defined by stops.

In the form of the embodiment of the invention illustrated by Figs. 5 to 7 inclusive for three ranges of adjustment for example, the optical deflection members 13 and 14 are arranged on a carrier 20 which, for example, is formed as a mounting for a correction member 21 mounted in advance of the objective or field lens and are mountable on the axially slidable front fastening ring 17 of the objective 4. Optical deflecting member 14 is mounted on the carrier 20 in about the same plane as the correction member 21 while the objective deflecting member 13 is mounted on an arm 20a projecting in front of the viewing window of the meter. The focusing mounting of the objective 4 has two handles and stops 9 respectively of which at least one is formed as a spring stop. With the arm 20a of the carrier 20 there is combined a stop segment 20b which moves with the carrier 20 on the objective 4 in the turning range of the handle 9 and accordingly permits the positioning of the objective only in the path of rotation not being blocked by the stop segment 20b on an extension 20a and in which the sensing element 6 contacts the curved step or stage 8b or 8c corresponding to the range belonging to the members 13 and 14 slidable in front of the telemeter sensing element.

Through the arrangement of the stop segment 20b in one or the other circumferential direction (Fig. 7) in co-ordination with the corresponding optical members 13 and 14 two near ranges of adjustment may be controlled in simple manner by means of corresponding stepped curves 8b and 8c. The adjustment path of the handle 9 arranged for the normal range of adjustment of ∞–1 m., is insured through a second fixed arresting stop 11a which can first be carried over after actuating the spring lock handle 9 limiting the near adjustment range. Both stops and handles 9 work at times with a stop segment 20b. The correction member 21 serves on occasion for calculated correction of conditions of photographic field lens and also for shorter distances than 1 m. to improve and compensate in given cases for image field fading.

The mode of action of both forms of embodiment of Figs. 1–4b and 5 to 7, is as follows: The range of adjustment for ∞–1 m. corresponds to the rotation path of the adjustment handle 9 between the limiting stops 11 and 11a (Fig. 6) and also to the curved step 8a for the guide arm 6 of the telemeter. For example to adjust distances from ∞ to 1 m., handle 9 may go from stop 11 to stop 11a (Fig. 4b). When handle 9 has reached stop 11a, it will be blocked and therefore it is necessary for the user to actuate or change certain parts if further adjustment of distances less than 1 m. is wanted. Moreover, for accomplishing a closer adjustment range a carrier 12 (Figs. 1 to 3a) or 20 (Figs. 5 to 7) with corresponding insertable front measuring elements 13 and 14 is shifted on a corresponding part 16 or 17 or 5d respectively of the objective mounting or camera housing 1. The stop segment 12a or 20b respectively of the carrier 12 or 20 respectively covers accordingly the path of movement of the handle 9 to such an extent that only the adjustment range corresponding to the members 13 and 14 is free as a turning path for the handle 9. Upon transition from the first to the second range of adjustment the further turning of the focusing mounting by means of the handle 9 is accomplished after a previous unlocking and passing over of the arresting stop 11a whereby the guiding arm 6 changes from the curved step 8a to the curved step 8b (Figs. 4b and 6) and returns the optical deflecting element 3a of the telemeter to its starting position (∞–1 position). In case a further near adjustment range is needed then another carrier 12 or 20 respectively with other optical members 13 and 14 are mounted on the objective 4 or the camera housing 1, whereby their step segment 12a or 20a respectively covers the already overriding turning path of the handle 9 and releases the further curved step 8c (Fig. 6) corresponding to the turning path of the handles and stops 9 respectively.

Figure 9:
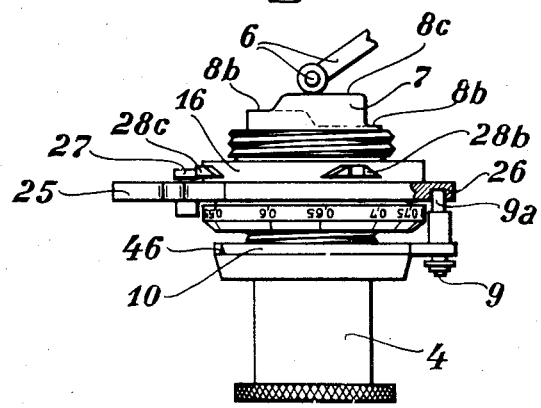
Fig. 9 is a plan view of telemeter elements of the embodiment of Fig. 8.

In the embodiment of Figs. 8 and 9 a carrier 25 is arranged co-axial with the objective 4 which, in the manner of a revolving disc, carries several optical deflecting pairs 13, 14 and 13a and 14a in front of the measuring element and is rotatably mounted on the objective mounting or on the camera housing 1. The carrier 25 is provided with a slot 26 concentric with the optical axis of the objective and with a length of arc corresponding with the adjustment range of the telemeter. It has, moreover, a spring stop 27 which co-acts with stops 28a, 28b and 28c mounted in fixed position on the objective mounting or the camera housing 1 which insures its position relative to the objective mounting or the camera housing respectively. The adjustment mounting of the objective is again provided with at least one handle and stop 9, 9a, preferably formed as a spring actuated plunger bolt, the part 9a of which works together with the slot 26 of the carrier 25. Upon turning the carrier 25 about the turning axis from one stop 26 to the other the front control elements 13, 14 or 13a, 14a, respectively, are moved from or shifted into the light beam path of the measuring detector and at the same time the movement of the handle corresponds with these positions. The transfer of the test element 6 of the movable optical deflector from one curved step 8a to the others (8b or 8c) follows automatically in the same manner as previously described upon turning the focusing mounting upon transfer from one to the other range of adjustment.

This embodiment has the advantage over the previously described embodiments that it is proof against errors since for every range of adjustment only the range of rotation of the handles and stops 9 limited by the length of slot 26 and corresponding to that particular adjustment is ever made available. With each shift or change over of the carrier 25 to another stop position 28a, 28b, 28c, the corresponding boundaries of the range of rotation for the stop and handle 9 are simultaneously changed over. If stop 27 is brought opposite to stop 28a no supplemental deflecting means 13, 14 or 13a, 14a are brought in the light beam paths of the telemeter. In this case the device is adapted for setting the range of ∞–1 m. If stop 27 is brought opposite to stop 28b, deflecting means 13a, 14a are brought in the light beam paths of the telemeter corresponding to a range of less than 1 m. If stop 27 is brought opposite to stop 28c deflecting means 13, 14 are brought in the light beam paths of the telemeter corresponding a still closer range.

The focusing mounting of the objective 4, the curved steps 8a, 8b, 8c and the guide arm 6 operate in the same manner as before described. The step 8a corresponds with the range, no supplemental deflecting means being brought in the light beam paths of the telemeter, step 8b corresponds with the deflecting means 13a, 14a and step 8c with deflecting means 13, 14, respectively.

In the further embodiment shown in Figs. 10 to 13, a carrier 30 is mounted on the camera housing 1 as a slide slidable along rails 24. This slide 30 carries the optical front members 13 or 13a, 14 or 14a, or cut outs 31, 32 in front of the measurement finder windows 2 and 3 of the camera 1. Here again the objective 4 is secured with the usual means to the camera housing 1. It is provided with handles or knobs 9 each with a spring pressed stop bolt 9a whose range of movement relative to the stationary part of objective mounting is bounded by stop bolt gudgeons or studs 33 and 34. These stop studs 33 and 34 are suitably screwed onto the stationary scale ring 47 carrying the distance indicator marks. An index 46 is secured to the rotatable part of the adjustment mounting by means of whose position on the scale ring 47 the adjusted distance can be read numerically.

The slide 30 has a circular arc shaped slot 35 as well as six aligned stop recesses 36, 37, 38, 39, 40 and 41. Between the slide and the camera housing two stop bolts 44 and 45 are arranged to co-operate with the stop recesses 36 to 41 and interconnected by means of interengaging levers 42. The stop bolts 44 and 45 are pressed toward the slide 30 by springs 43 and the ends toward the slide are formed with ball shaped domes. The stop bolts 44 and 45 can be pushed out of the stop recesses 36 to 41 against the pressure of the springs 43 by the stop bolts 9a actuated by the bolt knobs 9. In this embodiment the objective itself is provided in the manner previously described with stepped adjustment curves 8a, 8b, 8c for the probing arm 6 of the displaceable optical deflector of the telemeter.

Figure 10:
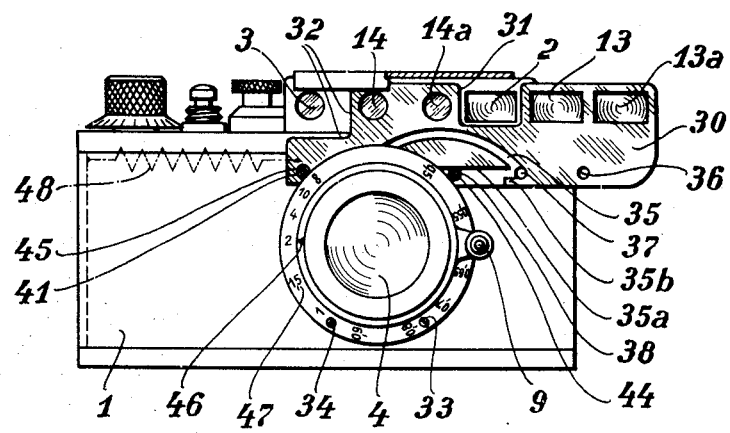
Fig. 10 is a front view of a camera embodying another form of the invention.
Figure 11:
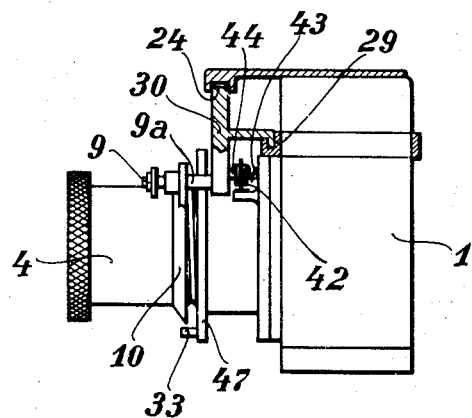
Fig. 11 is a side view partly in section of the telemeter elements of the embodiment of Fig. 10.
Figure 12:
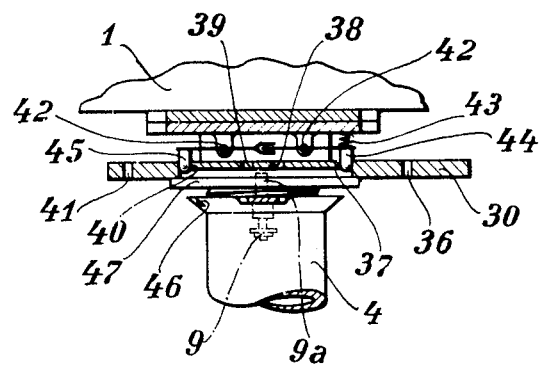
Fig. 12 is a horizontal section of the embodiment of Fig. 10 taken on the line 12—12 of Fig. 11.
Figure 13:
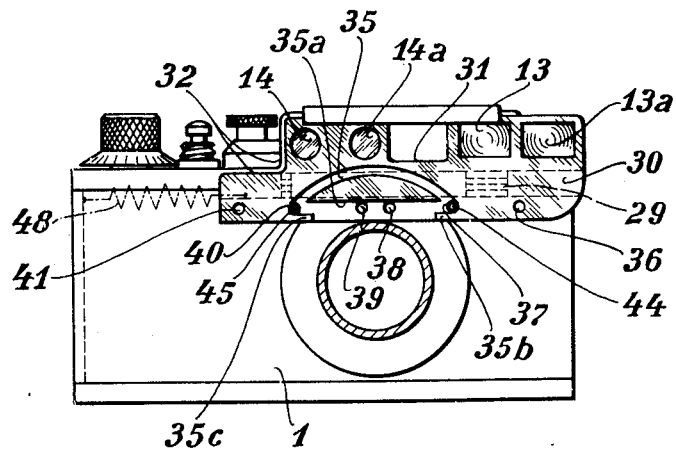
Fig. 13 is a front view similar to that of Fig. 10 showing parts of the telemeter adjusted to a different position from that of Fig. 10.

The operation of this embodiment is as follows:

In the position shown in Fig. 10 the telemeter has been brought into its normal adjustment range of ∞ to 1 m., that is, without insertion of the additional optical deflection means. The turning range of the handle 9 is limited by the stopping bolt or stud 33 of the scale ring 47 on one side and the stop and guide surface 35a of the carrier 30 on the other side. The range or distance data for the adjustment of the objective 4 are indicated on stationary scale ring 47 by the mark 46 on, and rotatable with, the adjustment mounting. Contact of the handle 9 with the stop bolt 33 corresponds with the ∞ position and ∞ distance of the adjustment apparatus. Stopping of the bolt 9a of the handle 9 against the guide and stopping surface 35a corresponds with a local distance of about 1 m.

If the bolt 9a of the handle strikes against the stop surface 35a it is co-axial with the stop bolt 44 which, in turn, extends through the stop hole 38 of the carrier 30 (Fig. 10). Upon depressing the handle 9 together with the bolt 9a in its axial direction the stop bolt 44 and the stop bolt 45 coupled with it are pressed backwardly against the action of the spring 43 so far into their stop bores 38—41 that, because of their ball shaped domes their residual stopping action is overcome upon shifting of the slide 30 along its rails. During this shifting the bolt 9a of the handle 9 slides on the guide and stop surface 35a respectively. In the position of Fig. 10 the slide 30 can be shifted to the left and indeed only until stop bolts 44, 45 slip into the next advancing stop holes 37, 40 (the positions of Figs. 12 and 13). In this position the arc shaped slot 35 is co-axial with the optical axis so that upon further turning movement of the objective 4 the bolt 9a can move in this slot. Reverse movement of the objective 4 in this range of adjustment is obstructed by a projection 35b of the carrier 30 which has become inserted by the shifting of the carrier 30 into the turning path of the bolt 9a of the handle 9. Toward the other direction the turning range of the bolt 9a of the handle 9 is limited by another projection 35c, Fig. 13, of the slide 30 which with the shifting of the carrier 30 has come equally into the turning path of the handle 9 and its bolt 9a. If the handle 9 with its stop bolt 9a has been turned up to contact with the stop 35c (first local range of adjustment), then the stop bolt 9a becomes located co-axially with the stop bolt 45 of the slide 30. Upon depressing the handle 9 together with its stop bolt 9a in its axial direction the stop bolts 44, 45 with their ball shaped domes are pressed back sufficiently while in this position that upon shifting the slide 30 toward the left (only a shifting toward the left is possible against the placement of the stop bolt 9a), the residual stop action of the stop bolts 44, 45 is removed and the slide can be shifted until the stopping of the stop bolts 44, 45 in the stop holes 36, 38. In this position the objective 4 can be turned only counter clockwise since in the opposite direction the stop bolts 9a strike against the guide and stop surface 35a. The adjustment mounting of the objective 4 can now be turned counter clockwise by means of the handle assembly 9, 9a until they strike the stop stud 34 of the scale ring 47 (second range of local adjustment).

If one wishes to return again to another range of adjustment of the objective, that is possible only by repeating the above described process in reverse sequence so that at the termination of each turning range the stop bolts 44, 45 must be actuated by means of the handle 9 and the slide 30 shifted before the continued turning of the adjustment mounting of the objective is possible in the same direction of turning.

In the last described embodiment an automatic exchange of the optical deflection members 13, 14, 13a, 14a, and the cut outs 31, 32 respectively may be attained by exposing the slide 30 to the action of a spring 48 which tends to shift the slide 30 in a direction to insert the next deflection member 13, 14. After releasing the stops 44, 45 holding the slide 30 the shifting then follows automatically.

Having described my invention, what I claim is:

1. A camera with built-in telemeter for different ranges of distance which comprises an objective tube movable on its axis, a rotatable ring coaxial with and having a transmission to said objective to move said objective axially upon rotation and having axially stepped positioning ways arranged in sequence about the axis of rotation of said ring, a telemeter sensing element and positioning means bearing on and positioned by said ways, a carrier having light deflecting elements placeable in the paths of light to said telemeter for selected positions of said rotatable ring and stepped ways, and releasable stop means to limit the range of rotation of said rotatable ring for each stepped positioning way of said ring to correspond with the positioning of said carrier.

2. The camera of claim 1 in which the entire rotation of the rotatable ring for all positions of adjustment is less than 360°.

3. The camera of claim 1 in which the releasable stop means comprises displaceable stops on said ring to engage stops fixed on the camera.

4. The camera of claim 1 in which the carrier has limit stops for the rotatable ring.

5. The camera of claim 1 in which the carrier is detachably mounted on the housing of the camera.

6. The camera of claim 1 in which the carrier is replaceably mounted on the objective tube.

7. The camera of claim 1 in which the carrier is provided with optical means for rectifying image fading and parallax of the finding image.

8. The camera of claim 1 in which the carrier is provided with optical correction elements for the objective for close distances.

9. The camera of claim 1 in which the carrier has a spring to move the optical deflecting elements automatically in position in co-operation with the adjustment movement of the objective.

10. The camera of claim 1 in which the carrier of the optical deflecting elements is positioned on the camera housing to position the optical deflecting elements into and out of the telemeter light beams and is provided with registering stop holes and with a pair of stop bolts spring pressed to engage in said holes and in which the carrier has an arc-shaped slot, a limit edge and two stop projections one at each end of said slot and in which said means to limit the range of rotation of the rotatable ring comprises spring pressed bolts to swing in said slot.

11. The camera of claim 10 having a spring to move the carrier after release of the limiting bolts whereby the carrier is moved to the next adjacent stop position.

12. The camera of claim 10 in which the carrier is provided with cut-out portions for normal long distance measurement.

13. Photographic camera with built-in range finder which comprises a focussing mounting for exchangeable objectives having a guide surface within the camera housing, said guide surface comprising portions stepped axially in a circular formation about the axis of the mounting to rotate and to move axially during focussing, a range finder having a probe element bearing against said guide surface to be moved by said guide surface during focussing to operate the range finder, each said axially stepped portion of said guide surface being coordinated with a set focussing range of the objective, optical attachments for the range finder, one for at least one of said stepped portions of said guide surface to adjust the range finder to the focussing range of its respective stepped portions, and releasable stop means to limit the focussing range of said mounting for each of said stepped portions.

14. A camera with a built-in telemeter for different ranges of distance which comprises an objective movable axially and having a pair of elements movable relative to each other to move the objective in an axial direction, one of said elements having stepped positioning ways arranged in sequence in the direction of movement of said elements, a telemeter sensing element having positioning means bearing on and positioned by said ways, a carrier having light deflecting elements placeable in the paths of light to said telemeter for selected positions of said movable element and stepped ways and releasable stop means to limit the range of movement of said movable element for each stepped positioning way to correspond with the positioning of said carrier.

15. A camera with built-in telemeter to measure different ranges of distances which comprises a camera housing, an objective tube mounted on said housing to slide on its optical axis, a rotatable ring co-axial with and having a transmission to said objective tube to move said objective tube axially upon rotation and having axially stepped positioning ways arranged in sequence about the axis of rotation of said ring, said ring having a bolt mounted thereon and manually depressible toward said camera housing, at least one stop mounted on said camera housing in the path of movement of said manually depressible bolt on said ring to limit the range of rotation of said ring, a telemeter sensing and positioning element bearing on said ways, a carrier slide mounted on said camera housing to slide transversely to the direction of the optical axis of said objective tube, said slide having a pair of cut-out portions and successive pairs of optical deflecting elements to be shifted successively into the paths of light beams of said telemeter and also having a series of pairs of spaced holes to correspond with said cut-outs and deflection elements, a pair of spring pressed bolts mounted on said camera housing to engage successively said pairs of holes as said cut-outs and deflecting elements are positoined in said light beams and connected together to be depressed simultaneously out of said holes by the manually depressible bolt of said ring, said carrier also having an arc-shaped slot in which said depressible bolt of said ring may move in a portion of its arc of movement.

16. The camera of claim 15 in which said carrier has a stop surface at each end of said arc-shaped slot to arrest the movement of said bolt and ring at the end of its movement in said arc.

17. The camera of claim 15 having a spring to draw said slide from one positoin of adjustment to another.

References Cited in the file of this patent

UNITED STATES PATENTS

| | | |
|---|---|---|
| 1,993,463 | Thorner | Mar. 5, 1935 |
| 2,032,060 | Kuppenbender | Feb. 25, 1936 |
| 2,041,633 | Barnack | May 19, 1936 |
| 2,108,751 | Kuppenbender | Feb. 15, 1938 |
| 2,193,459 | Kuppenbender | Mar. 12, 1940 |
| 2,358,121 | Wittel | Sept. 12, 1944 |
| 2,607,275 | Peterson | Aug. 19, 1952 |
| 2,805,609 | Nerwin | Sept. 10, 1957 |

FOREIGN PATENTS

| | | |
|---|---|---|
| 600,742 | Germany | Aug. 4, 1934 |
| 509,424 | Great Britain | July 14, 1939 |
| 849,485 | France | Aug. 21, 1939 |
| 698,123 | Germany | Nov. 1, 1940 |
| 256,018 | Switzerland | Feb. 19, 1949 |
| 804,063 | Germany | Apr. 16, 1951 |
| 518,121 | Belgium | Mar. 31, 1953 |
| 1,075,841 | France | Apr. 14, 1954 |